United States Patent [19]

Rehklau

[11] 4,113,196
[45] Sep. 12, 1978

[54] MAGNETIC TAPE CARTRIDGE LOADING APPARATUS

[75] Inventor: George D. Rehklau, Los Altos, Calif.

[73] Assignee: Electro-Sound, Inc., Sunnyvale, Calif.

[21] Appl. No.: 738,899

[22] Filed: Nov. 4, 1976

[51] Int. Cl.$^2$ .................. B65H 19/26; B65H 21/00
[52] U.S. Cl. ............................ 242/56 R; 156/506
[58] Field of Search .............. 242/56 B, 58.1, 58.5, 242/55; 156/502, 450, 506

[56] References Cited

U.S. PATENT DOCUMENTS

| | | | |
|---|---|---|---|
| 3,637,153 | 1/1972 | King | 242/56 R |
| 3,770,551 | 11/1973 | Ceroll | 242/56 R |
| 3,814,343 | 6/1974 | Bennett et al. | 242/56 R |
| 3,888,480 | 6/1975 | Bagozzi | 242/56 R |

*Primary Examiner*—George F. Mautz
*Attorney, Agent, or Firm*—Schatzel & Hamrick

[57] ABSTRACT

Apparatus for loading tape onto the hub of a magnetic tape cartridge spool and including a tape supply for supplying a continuous strip of tape, a carriage for locating the cartridge at a first position, a hub drive for turning the spool to wind tape thereon, a tape cutter for cutting the length of tape from the continuous strip, a flyer carried by the hub drive for releasably holding the ends of the tape wound upon the hub, a tape supply arm for moving the lead end of the strip into contact with the flyer, for guiding the strip as it is wound onto the hub and for aligning and holding the strip relative to the cutter, a take-up loop arm for measuring out a selected loop length of the tail portion of the length of tape wound upon the hub, for holding the tape as it is cut by the cutter and for moving the tail end of the length into contact with the flyer and positioning it in abutting relationship with the lead end held thereby, a splicer for applying a segment of splicing tape across the abutted lead and tail ends as they are held by the flyer, and a control system for actuating each of the operative components of the apparatus in a predetermined sequence.

25 Claims, 9 Drawing Figures

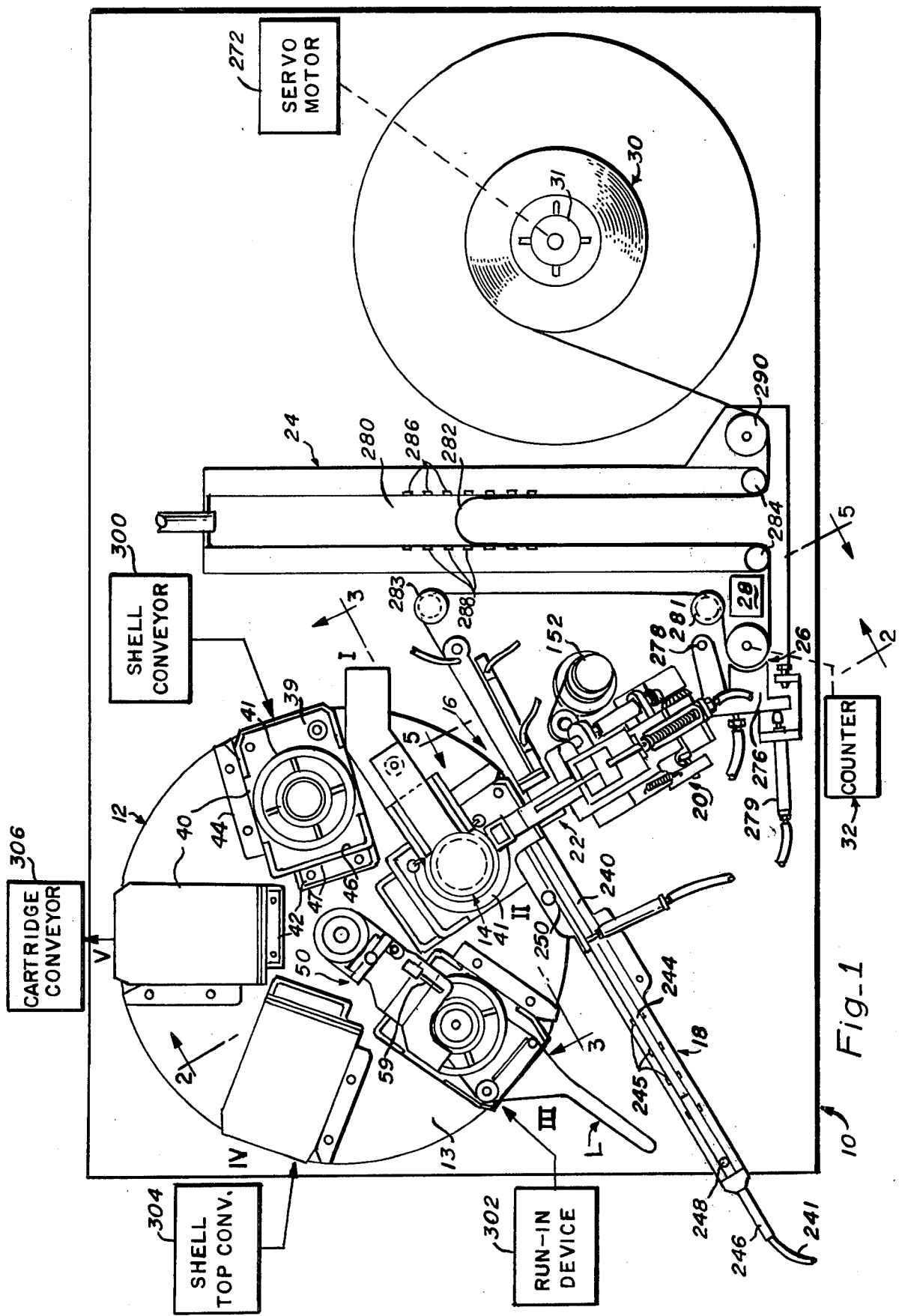
Fig_1

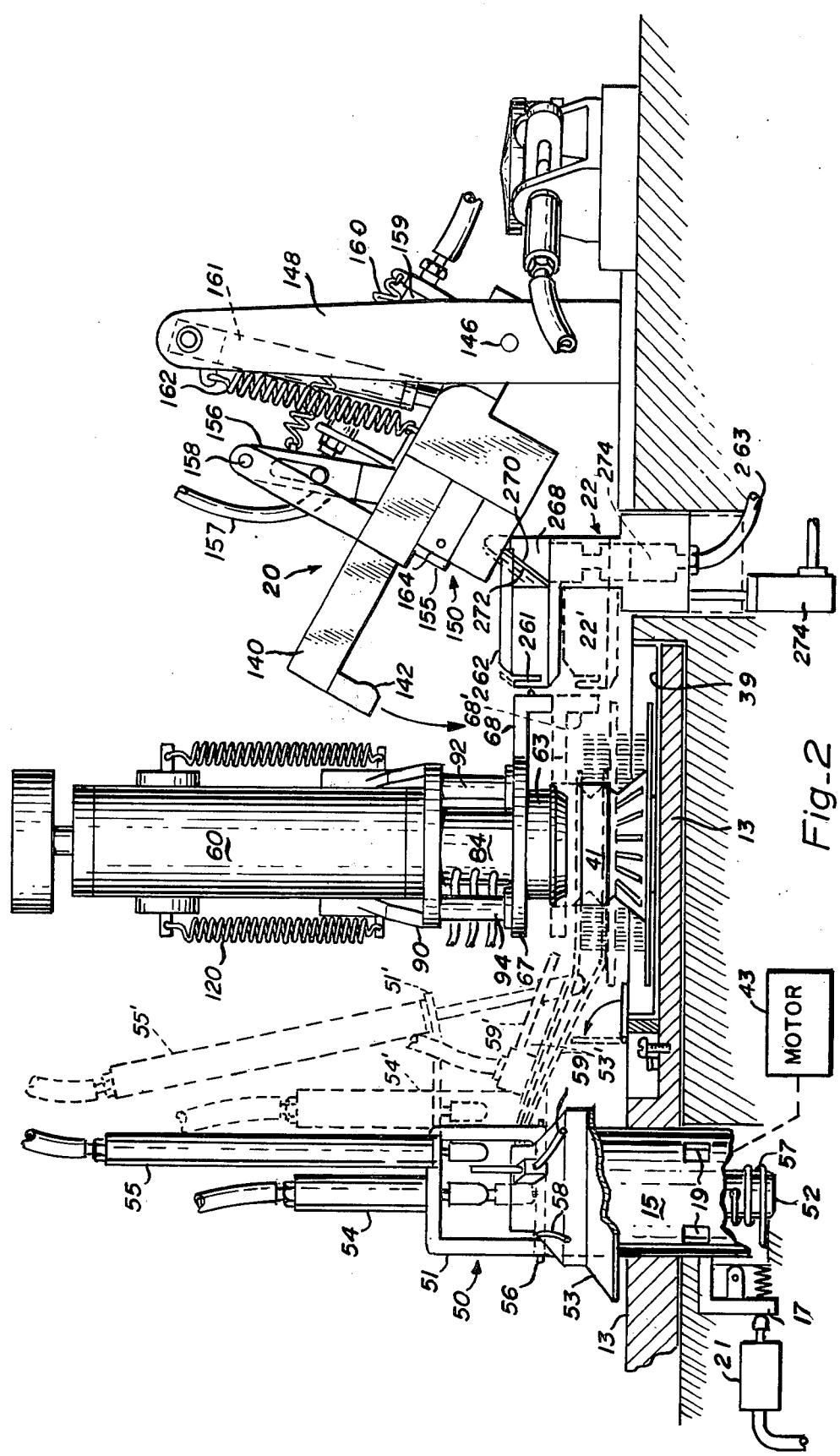
Fig_2

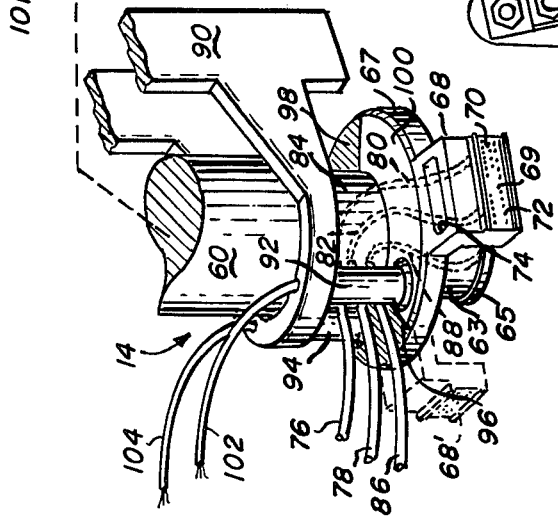
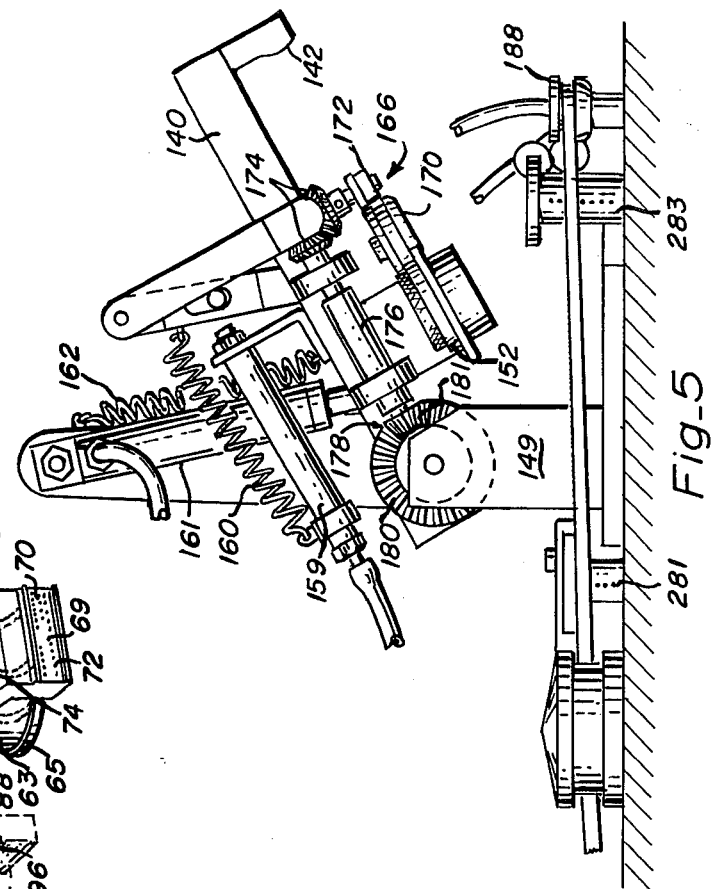
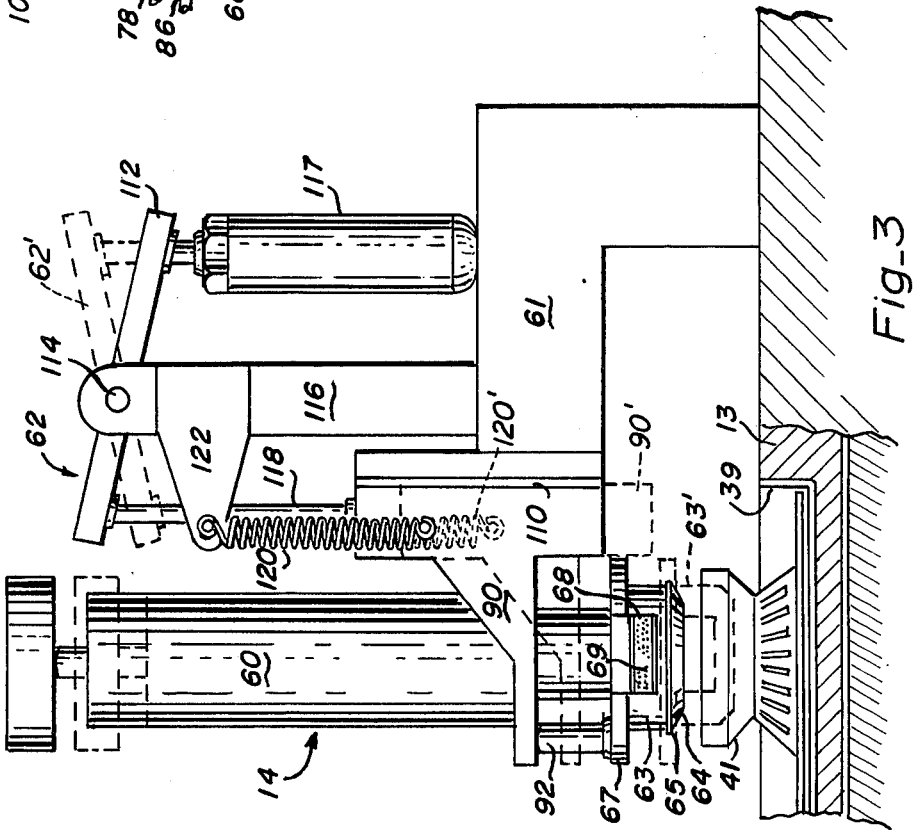

Fig. 9

MAGNETIC TAPE CARTRIDGE LOADING APPARATUS

BACKGROUND OF THE INVENTION

1. Field of the Invention

The present invention relates generally to tape loading apparatus and more particularly to a high speed, precision machine for automatically cutting and winding a predetermined length of magnetic tape upon a cartridge spool and then splicing the ends of the wound tape together.

2. Description of the Prior Art

Various devices have been used in the past to either automatically or semi-automatically wind magnetic tape onto the spools of containers of the types now commonly referred to as cassettes and cartridges. In loading tape into the latter type of container, which has a single spool upon which the length of tape is to be wound with its ends spliced together, special problems are encountered due to the fact that if the length of tape and the winding tension are not carefully controlled the cartridge may not operate in the intended manner. Furthermore, the spliced ends must be accurately aligned and precisely abutted together so as to avoid winding misalignment problems, excessive head wear due to abrasive particles carried by a faulty splice and splice destruction caused by frictional contact with various parts of the cartridge.

Prior art devices of the type mentioned above are disclosed in the following U.S. Pat. Nos. B535,448; 3,495,782; 3,582,009; 3,637,153; 3,693,900; 3,677,505; 3,717,314; 3,717,923; 3,727,859; 3,737,358; 3,753,834; 3,770,551; 3,776,487; 3,787,270; 3,797,770; 3,814,343; 3,848,825; 3,888,480; and 3,940,080.

Although such prior art devices have been available for some time now none have found general acceptance for magnetic tape cartridge loading applications due to inherent limitations such as lack of application flexibility, lack of precision control, unsuitableness for fully automatic assembly application, lack of dependability and sundry other disabilities and disadvantages.

SUMMARY OF THE PRESENT INVENTION

It is therefore an object of the present invention to provide a novel cartridge loading apparatus which accurately controls the overall length, tension and loop length of the tape wound upon a cartridge spool.

Another object of the present invention is to provide a novel cartridge loading machine which can automatically perform a continuous precision winding operation without operator intervention.

Still another object of the present invention is to provide a novel cartridge loading apparatus which is capable of automatically loading either blank or prerecorded magnetic tape into cartridges.

Briefly, the preferred embodiment includes a turntable for transporting and sequentially positioning the cartridge spools to be wound, a hub lift and drive assembly, a tape cutter, a tape supply and tension control assembly, a tape supply arm for feeding the tape onto the hub as it is wound, a take-up loop measuring arm, and a tape splicing assembly. In addition, an electronic and pneumatic control system is included for controlling the various operative components.

Among the numerous advantages of the present invention are that it rapidly and accurately winds recording tape upon a cartridge hub, it automatically controls the tension of the tape wound onto the hub, it automatically controls the loose loop length of the tape wound upon the hub, and it automatically splices the two ends of the tape together.

Another advantage of the present invention is that it provides a fully automated, precision tape loading apparatus which operates at a high rate of speed.

Still another advantage of the present invention is that it provides a precision cartridge loading apparatus which can be integrated with automated in-feed and out-feed conveyors to provide a totally automatic cartridge manufacturing system.

These and other objects of the present invention will no doubt become apparent to those skilled in the art after having read the following detailed description of a preferred embodiment which is illustrated in the several figures of the drawing.

IN THE DRAWING

FIG. 1 is a plan view showing the various components of a cartridge loading apparatus in accordance with the present invention;

FIG. 2 is a partially sectioned elevational view taken along the line 2—2 and showing the turntable assembly, hub drive assembly, and tape splicing assembly illustrated in FIG. 1;

FIG. 3 is a partially sectioned elevational view taken along the line 3—3 and further illustrating the hub drive assembly shown in FIG. 1;

FIG. 4 is a partially broken schematic view further illustrating the hub drive assembly shown in FIG. 1;

FIG. 5 is an elevational view taken along the line 5—5 to show the opposite side of the tape splicing assembly shown in FIG. 2;

FIG. 9 is a chart depicting the operational sequence of the present invention.

DETAILED DESCRIPTION OF THE PREFERRED EMBODIMENT

Figure 7:
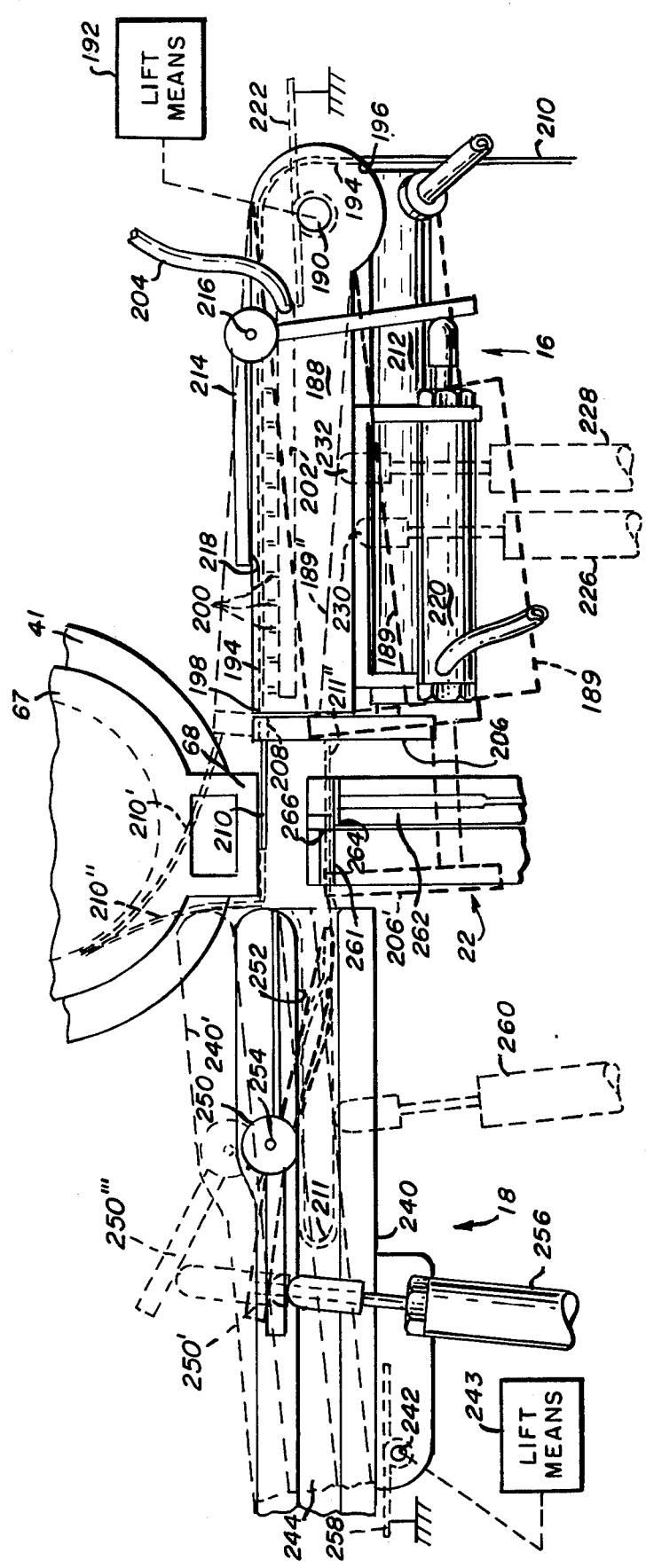
FIG. 7 is a plan view partially illustrating the supply arm assembly, take-up arm assembly, tape cutter assembly, and hub drive assembly shown in FIG. 1 of the drawing.

Referring now to FIG. 1 of the drawing, the principal operative components of a preferred embodiment of the present invention are shown to include a chassis 10, a rotatably mounted turntable 12, a hub drive assembly 14, a tape supply arm assembly 16, tape take-up arm assembly 18, a tape splicing assembly 20, a tape cutting assembly 22, a tension control vacuum chamber 24, a tachometer assembly 26, a que-tone sensor 28, and a tape supply assembly 30. A digital count display unit 32 which responds to the output of tachometer assembly 26 is also mounted to chassis 10. Contained beneath the top of chassis 10 is an electronic and pneumatic control system, which is generally illustrated in FIG. 7, and which is used to control the various components of the device. The operation of the control system is explained in detail below.

Turntable assembly 12 includes a circular disk 13 having five rectangular recesses 40 for receiving the lower half shells 39 of cartridges containing a spool having a hub 41 upon which magnetic recording tape is to be wound. Each recess is provided with an adjustable back edge guide 42 and an adjustable side edge guide 44. In addition to providing a back reference surface for radially positioning the cartridge shell relative to the turntable, back edge guide 42 also includes a U-shaped flange 46 which extends over the rear portions of the side edges of the cartridge shell 39 to prevent it from being lifted up as the hub is raised during the winding operation. The flanges 46 are pivoted at 47 (see also FIG. 2) so that they may be rotated up and out of the way when the top shell is installed over the loaded hub. Springs 49 (FIG. 2) normally hold flanges 46 in the lowered position.

Turntable 13 is turned by means of a drive motor 43 that turns shaft 15 and is indexed into the various positions by a latching mechanism 17 that engages notches 19 in shaft 15. The latch 17 is actuated by a pneumatic actuator 21.

In the operational sequence, cartridge shells 39 are loaded at position I; tape is loaded onto the hub 41 and spliced at position II; the loop is run in at position III; the top shell of the cartridge is installed and fastened at position IV; and the completed cartridge is discharged at position V.

As further shown in FIG. 2. the turntable assembly also includes a packer arm subassembly 50 which is comprised of a bracket 51 mounted to a shaft 52 that is concentric with the turntable shaft 15, a packer arm 53 that is pivotally mounted to bracket 51 and a pair of pneumatic actuators 54 and 55 that resepctively raise and lower arm 53 by causing it to pivot about a pivot pin 56. A spring 58 wrapped about pin 56 biases arm 53 downwardly. A spring 57 carried by shaft 52 biases the shaft 52 and thus packer arm 51 in the counterclockwise direction so that when raised by actuator 54 out of engagement with a hub located at position III, it will automatically swing into engagement with a hub located at position II. Although spring 58 urges arm 53 downwardly, the biasing force is light so as not to cause a hub raised by drive assembly to be dropped. As will be further explained below, the actuator 55 provides a means for separating the hub from the hub drive at position II. A blower tube 59 is also carried by arm 53 to blow the tape loop L away from the cartridge shell as depicted in FIG. 1.

Referring now to FIGS. 3 and 4, the hub drive assembly 14 is shown to include a motor 50 which is supported in cantilever fashion over turntable position number II by a support member 61 and a raising and lowering subassembly 62. Motor 60 is provided with a hub pick-up spindle in the form of a cylinder 63 which is tapered at its lower end 64 and has a circumscribing pneumatically actuated O-ring 65 that is caused to expand and engage the inner periphery of the hub 41 when cylinder 63 is inserted thereinto as illustrated by the dashed lines 63'. Attached to the top of cylinder 63 is a circular plate 67 having a tape carrying flyer 68 extending radially outwardly therefrom.

As is more clearly shown in FIG. 4, flyer 68 extends downwardly at its outer extremity and has a tape receiving horizontally extending recess 69 provided therein. The vertical width of recess 69 is equal to the width of the magnetic tape to be wound on hub 66. Recess 69 is provided with a first set of vacuum holes 70 on one side thereof for holding the supply end of the tape on the flyer, and a second set of holes 72 on the other side thereof for holding the tail end of the tape while a splice is being accomplished. Flyer 68 is also provided with an opening 74 for receiving a backing block as will be described further below. Vacuum is supplied to the holes 70 and 72 through two tubes 76 and 78, respectively, which communicate with the holes through passageways in plate 64 and a sleeve 84 as illustrated by the dashed lines 80 and 82. Sleeve 84 serves as a manifold device having sliding seals engaging the upper surface of plate 64 so as to supply vacuum to holes 70 and 72 even though plate 67 is turning. Pressurized air for expanding the O-ring 58 is similarly supplied through a tube 86 and a passageway illustrated generally by the dashed lines 88.

Mounted to the bracket 90 and extending downwardly to points proximate the upper surface of plate 64 are a pair of photoelectric sensors 92 and 94 which sense passage of the interfaces 96 separating the dark surface area 98 and the light surface area 100. In order to provide an indication of the positioning of flyer 68, electric signals generated by the sensors 92 and 94 are fed through the lead wires 102 and 104 to the motor control circuitry. Once positioned in either the splicing position or the hub release position shown by the dashed lines 68', a pneumatically controlled hub lock (not shown) of suitable configuration is actuated to prevent the flyer 67 from moving.

As illustrated in FIG. 3, bracket 90 is slideably affixed to member 61 at 110 and is raised and lowered by means of the pneumatic piston and lever assembly 62. The center of lever 112 is pivotally attached at 114 to an upstanding member 116 and has one end affixed to the piston of a pneumatic actuator 117 and the other end affixed to bracket 90 by a rod 118. Bracket 90 is normally maintained in the illustrated upper position by means of a spring 120 which is affixed to an arm 122 extending outwardly from member 116.

As indicated by the dashed lines, when actuator 117 is pneumatically energized it causes lever 112 to drive bracket 90 downwardly against the force of spring 120 so as to lower the hub drive assembly 14 into the hub pick-up position. In this position cylinder 63 will extend into the upper part of hub 41 as shown by the dashed lines 63' so that when air pressure is applied to O-ring 65 it will be caused to engage the inner periphery of the hub and enable it to be picked up from the cartridge bottom shell 39 and raised to the wind position more clearly shown in FIG. 6.

Returning now to FIG. 2, the splicer assembly 20 is shown to include an outwardly extending member 140 that terminates at one end in a downwardly extending backing bar 142 and has its other end pivotally attached at 146 to an upright support 148. Member 140 carries a splicing mechanism 150 that is further illustrated in FIGS. 5 and 6, and includes a reel 152 (FIG. 5) for carrying a quantity of splicing tape, a splicer applicator 154 (FIG. 6) which is slideably received within the mechanism and is moved into the extended position illustrated in FIG. 6 by means of a lever 156 that pivots about the point 158. Lever 156 is driven by a pneumatic actuator 159 and is returned to its rest position by a spring 160. Member 140 is driven downwardly by an actuator 161 (FIG. 5) and is returned to its rest position (FIG. 2) by a spring 162.

Applicator 154 has a rectangularly shaped splicing tape carrying end 155 with a plurality of small holes in its surface for communicating with a small vacuum chamber disposed therebehind. A vacuum is drawn in the chamber through a tube 157 so as to hold a section of tape which is fed across the end 155. A cutting mechanism is provided at 164 so that a section of splicing tape fed from the strip carried by reel 152 is deposited adjacent end 155, held in place by the vacuum created therebehind, and carried to the splicing position shown in FIG. 6 where it is applied to the tape ends held in place by flyer 68. Note also in FIG. 6 that as arm 140 is lowered, the backing bar 142 extends through the opening 74 in flyer 68 and into engagement with the back surface 75 thereof. This serves as a means for offsetting the splicing force applied to the face of flyer 68 by applicator 154 as the splicing operation is performed.

Splicing tape is supplied to the applicator 154 from reel 152 (see FIG. 5) by means of a gear driven feed mechanism 166 including an idler roller 170 and a drive roller 172 that is driven by means of a beveled gear pair 174, a clutch mechanism 176 and a second beveled gear pair 178. The gear pair 178 includes a fixed gear 180 that is mounted to support member 149, and a movable gear 181 which is carried by member 140 and drives clutch 176 as member 140 is rotated into the splicing position illustrated in FIG. 6. Clutch 176 is a one-way drive device which causes tape to be advanced through the feed mechanism when member 140 is lowered, but slips and imparts no drive to the feed mechanism as member 140 returns to its rest position.

In FIG. 7, the supply arm assembly 16 and take-up arm 18 are shown in enlarged detail along with a portion of plate 67 and flyer 68 and tape cutter 22. As depicted, supply arm 16 is comprised of an elongated arm 188 which is pivotally supported at 190 relative to chassis 10 and may also be raised and lowered relative thereto by a suitable mechanism shown schematically as a lift means 192. Arm 188 is provided with a tape guiding recess shown by the dashed line 194, that extends from an entry point 196 to an exit point 198 at the distal end of the arm. The recessed slot 194 has a series of vacuum apertures 200 disposed along its length through which a vacuum is drawn by means of a manifold chamber 202 and a vacuum tube 204.

A tape loop extender 206 is disposed at the distal end of arm 188 and is movable between a retracted position illustrated by the solid line and an extended position illustrated by the dashed lines 206'. Extender 206 is provided with an opening 208 which is aligned with slot 194 to provide a guide passageway for the magnetic recording tape 210. Extender 206 is moved between the retracted and extended position by means of a hydraulic actuator 212 that is mounted to the side of arm 188 and is carried thereby. Mounted to the top of arm 188 is a tape clamping mechanism 214 which pivots about the point 216 so that clamping foot 218 moves between an open position and a tape clamping position. Mechanism 214 is moved from the open position into the tape clamping position by means of a pneumatic actuator 220 which is also carried by arm 188.

The supply arm 188 is biased to rotate in the counterclockwise direction about pivot 190 by a suitable spring means shown schematically at 222 and normally assumes the rest position illustrated by the dashed lines 189. Arm 188 is also movable into two other positions by means of a pair of pneumatic actuators 226 and 228 which drive stops 230 and 232 respectively so as to stop arm 188 in the positions illustrated by the solid lines 180' and the dashed lines 189", respectively.

Take-up arm assembly 18 is comprised of an elongated arm 240 (see also FIG. 1) which is pivotally connected to chassis 10 at 242 and is rotatable between a first position illustrated by the solid lines 240 and a second position illustrated by the dashed lines 240'. Arm 240 is also raised and lowered relative to chassis 10 by a suitable lift means 243. Extending longitudinally along member 240 is a vacuum chamber 244 for drawing in a length of tape to determine the loop length of the tape wound upon the hub 41 as will be explained further below. The top surface of arm 240 is made of a transparent material so that the loop received therein may be visually inspected. The length of chamber 244 is adjustable by means of a slide 246 (see FIG. 1) which is locked in place by a thumb screw 248. Vacuum and blow-out pressure are supplied to chamber 244 through a passageway in slide 246 that is connected to a vacuum/pressure supply tube 241. Mounted to the top of member 240 is a clamping device 250 having an end 252 for clampingly engaging tape drawn into chamber 244 as device 250 is rotated about the pivot point 254. Device 250 is rotated between a rest position and a clamping position by means of a pneumatic actuator 256 that is mounted to and carried by arm 240. Arm 240 is biased to rotate in the clockwise direction about pivot 242 by means of a spring schematically illustrated at 258 and normally assumes the rest position illustrated by the solid lines 240. As will be further explanied below, arm 240 may be selectively rotated into a second position illustrated by the dashed lines 240' by means of a pneumatic actuator that is schematically shown at 260". As illustrated in FIG. 2, several photocell light source pairs 246 are also provided along the walls of chamber 244 and may be selected depending upon the positioning of slide member 246 so as to provide an indication to the control electronics as to when a loop is fully drawn into the chamber.

Referring now additionally to FIG. 2, the vertical cutter 22 is comprised of a suitable means for cutting the magnetic tape on a bias angle, and in the preferred embodiment includes a tape receiving slot 261 which is open at the top for receiving the tape to be cut and an elongated shearing member 262 having an edge 264 that cooperates with the static edge 266 to shear the length of tape positioned in slot 261. Shearing member 262 is moved laterally by the pneumatic actuation via tube 263 of a camming means 268 (FIG. 2) which has an inclined surface 270 that engages a similar surface 272 on member 262 and causes member 262 to move leftwardly as the surfaces 270 and 272 move relative to each other. The entire cutting assembly is also movable between a raised position and a lowered position, illustrated by the dashed lines 22', by means of a pneumatic actuator 274.

Returning back to FIG. 1, it will be noted that the vacuum chamber assembly 24 is comprised of means forming an elongated chamber 280 for receiving a loop 282 of the magnetic tape to be wound upon the hub 41. A pair of roller guides 284 are positioned at the mouth of the chamber 280 to guide the loop thereinto and a plurality of light sources 286 and matching photocells 288 are positioned along opposite sides of chamber 280 to provide an indication to the control electronics of the position of the end of loop 282 within chamber 280. A vacuum of approximately one-quarter of an ounce is normally drawn in chamber 280 to maintaining the loop 282 fully stretched out therein. The tape loop 282 is fed from the supply reel 30 over a roller guide 290.

The purpose of chamber assembly 24 is to provide a dragless means for monitoring the tension in the tape as it is wound about hub 41. This is accomplished by detecting the length of the loop 282 using the photocells 288 and by inputing their output signals into a servo control system which increases or decreases the speed of a servo motor 272 that drives the supply reel 30.

After passing through chamber 280, the tape passes over a que-tone sensor 28 for sensing prerecorded que-tones on the tape and thence over the rotatable pulley 274 of a tachometer 26. In order to insure that there is a minimum of slippage between pulley 274 and the tape, an air pressure pad 276 is provided which directs a stream of air onto the tape tending to compress it against the surface of pulley 274. Pad 276 is pivotable about pivot point 278 between a rest position and an operational position by means of a pneumatic actuator 279.

Upon leaving tachometer pulley 274 the tape is fed around a pair of air bearings 281 and 283 (see also FIG. 5) which provide frictionless guidance for the tape yet permit it to move up and down as supply arm 188 changes position.

Figure 8:
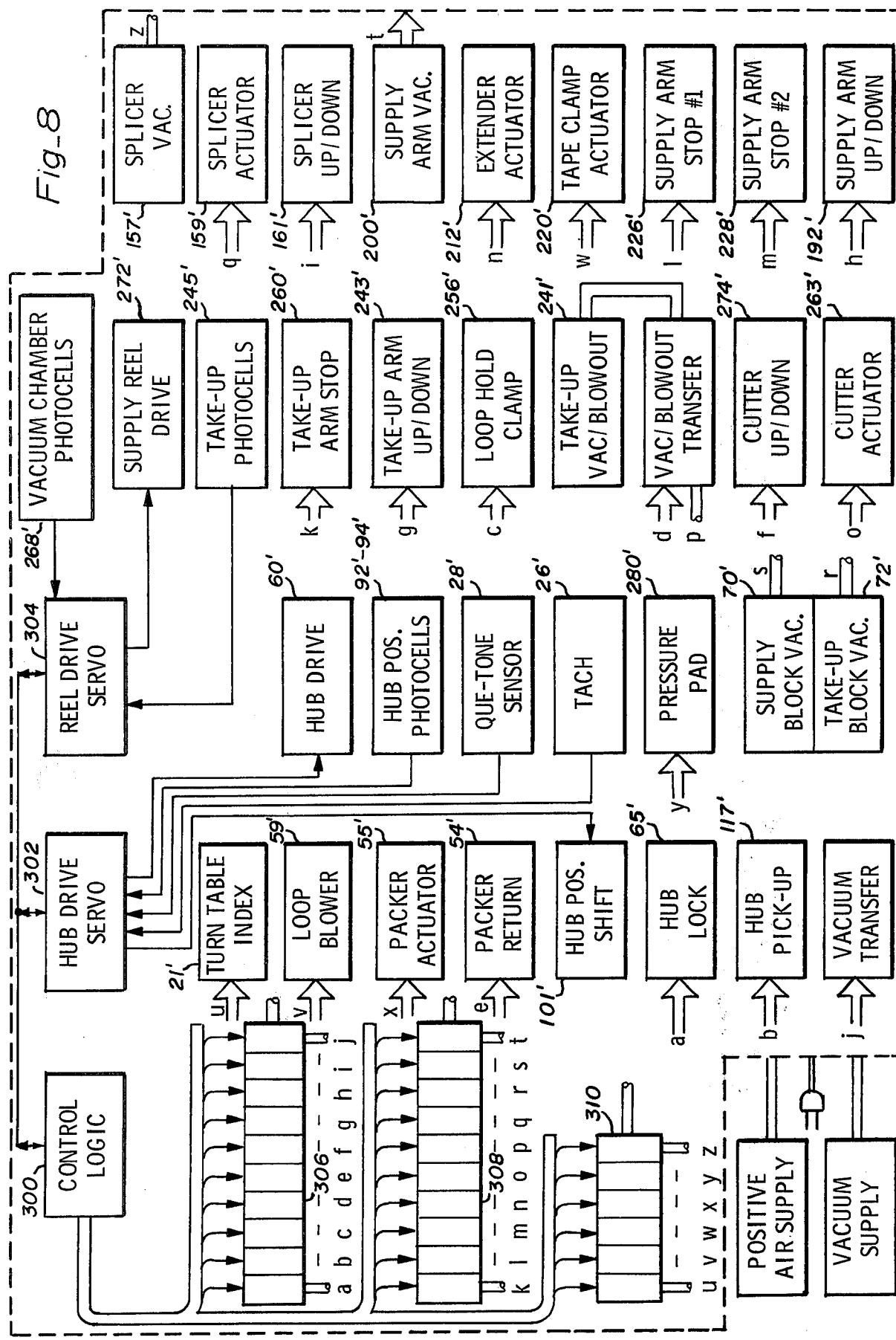
FIG. 8 is a block diagram schematically illustrating the control system of the cartridge loading apparatus illustrated in FIG. 1.

In FIG. 8 a block diagram is provided schematically showing the electronic and pneumatic control system of the present invention. Where appropriate, the various blocks are designated with primed numerals corresponding to the call out numerals previously referred to in discussing FIGS. 1–7. In the preferred embodiment operative control of the various components of the previously described machine is effected by an electronic control system 300 which is programmed to cause each of the components to be actuated in a predetermined sequence. The control logic 300 may take any electronic, electromechanical or electropneumatic form capable of being programmed to operate sequentially and in response to electrical or other monitoring signals fed back thereto from the operative components and drives therefor and to generate appropriately timed control signals.

In addition to signals generated to control the hub drive servo amplifier 302 and a reel drive servo amplifier 304, signals are also generated by logic 300 for controlling three banks of valves 306, 308 and 310. The various valves in the bank couple either positive or negative (vacuum) air pressure to corresponding ones of the pneumatic actuators or blow nozzles illustrated in the block diagram. For clarity of illustration, actual connections between the respective valves an the corresponding actuators and blower nozzles have not been shown. Instead, the several valves have been identified by alphabetical letters and the pneumatic inputs to the blocks representing corresponding actuators and blower nozzles have been similarly identified.

In the preferred embodiment positive air pressure is provided by an external air supply operating at a pressure of 100 lbs. with a maximum flow rate of 3 cu. ft. per minute. Negative air pressure (vacuum) is also provided by four individual vacuum sources that are coupled into the device. Each such source has a vacuum level of 22 inches of mercury. Electrical service to the device is 110 volts AC, 30 amp service.

The hub drive servo amp 302 receives inputs from control logic 300, the hub position photo cells 92 and 94, the que-tone sensor 28 and the tachometer 26 and responds thereto to control operation of the hub drive motor 60. Motor 60 can be operated in forward, reverse and creep modes. Similarly, the reel drive servo amp 304 receives input signals from control logic 300, the vacuum chamber photocells 268, and the take-up chamber photocels 245 and responds thereto to control operation of the supply reel servo motor 272. Motor 272 can be caused to operate over a range of speeds in both the forward and reverse directions.

In operation, a reel of magnetic recording tape 30, sometimes referred to as a "pancake", of approximately 7200 ft. in length is placed on supply spindle 31 and the tape leader is around pulley 290, through vacuum chamber 34, past que-tone sensor 28, around tachometer pulley 26, around air guides 281 and 283, and through supply arm 16. The tape end is then threaded through cutter 22 and the cutter is actuated to cut the leader and provide a lead end. A cartridge bottom shell is then either manually or automatically loaded into the turntable recess at position I and the turntable is advanced to position II. At this point an "operation complete" signal is generated by the control logic and the machine is ready to be started.

Figure 9:
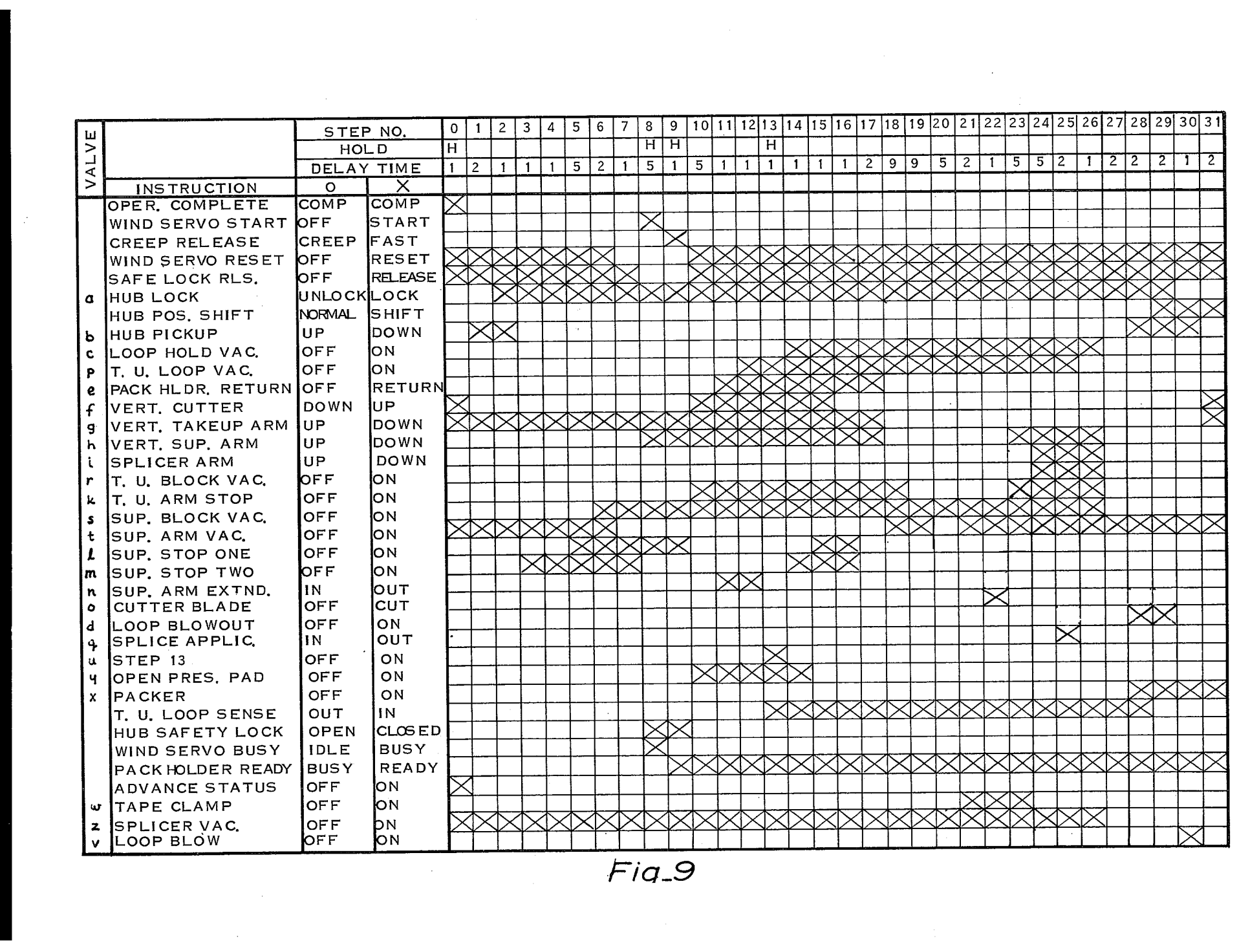

Referring now to the program table shown in FIG. 9, it will be noted that initially the wind servo reset is in the reset configuration, the safety lock release (not shown) is in the release configuration, the cutter 22 is in its "up" position, vacuum is supplied to supply arm 16, and the take-up arm 18 is in the "down" position. The operational sequence then begins with an output from control logic 300 which opens valve "$b$" to energize actuator 117 which drives the winding assembly 14 (hub pick-up cylinder 63) downwardly to mate with the hub 41. Valve "$f$" is also closed to deenergize actuator 274 and allow cutter 22 to return to its "down" position. Valve "$a$" is then opened to supply air to the hub lock O-ring 65 causing it to expand and lock the cylinder 63 to hub 41. Valve "$b$" is then closed to deenergize actuator 117 and allow spring 120 to return the winding assembly 14 to its upper position lifting with it hub 41.

Valve "$l$" is then opened to energize supply stop actuator 226 which moves supply arm 188 into the position illustrated by the solid lines in FIG. 7 so that the tape lead end 210 is positioned against the supply block face 70 of flyer 68. Valve "$s$" is then closed to turn on the supply block vacuum. The vacuum to supply arm 16 is then turned off by closing valve $t$ and the wind servo reset goes to off to reset the hub drive servo 302.

Next, the lift means 192 is actuated to pull the supply arm 16 into its down position; supply stop 232 is actuated by opening valve $m$ so as to cause supply arm 16 to move into the position indicated in FIG. 7 by the dashed lines 189"; the wind servo start goes to start; and the safety lock release goes off.

At this time the tape end 210 (FIG. 7) is held tightly by a flyer 68; supply arm 88 is in the hub feed position 189"; and the vacuum in supply arm 16 is turned off so that tape may be pulled therethrough.

Flyer 68 then begins winding tape very slowly onto hub 41 until the hub has made several revolutions. Note that since supply arm is lowered and is swung into its feed position 189" immediately adjacent the tape receiving portion of the hub, it will properly feed tape onto the hub even though the tape end is held above the hub by flyer 68 (see FIG. 6). After the hub is wound through several revolutions creep release goes to "fast" allowing the servo to drive hub 41 at a high rate of speed until the proper length of tape is wound thereon as determined by tachometer 26. After the servo has stopped driving hub 41, supply stops 230 and 232 go to "off" as valves "$l$" and "$m$" close so as to allow supply arm 16 to return to the position shown by the dashed lines 189 in FIG. 7. At the same time, valve "$f$" opens to energize actuator 274 so as to raise cutter 22 into its upper position and out of the way of extender 206; valve "$g$" opens to energize actuator 260 so as to move take-up arm 240 into the position illustrated in FIG. 7 by the dashed lines 240'; and the wind servo reset goes "on".

Figure 6:
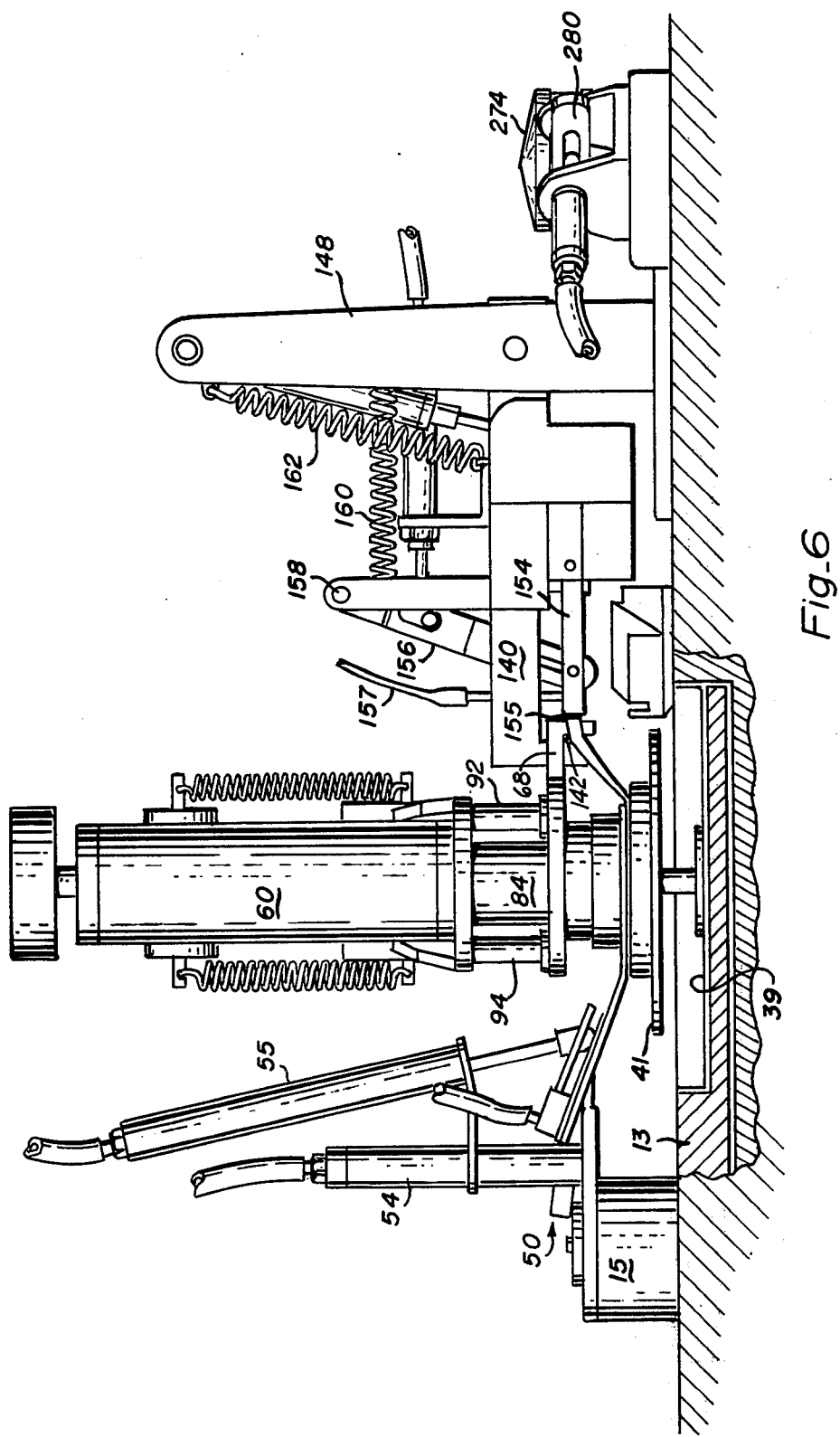
FIG. 6 is an elevational view similar to that illustrated in FIG. 2 but with the components shown in a different phase of the operational sequence.

Valve "e" is then opened to energize actuator 54 and cause the packer arm 53 to be lifted and swing into position above the now wound hub 41 (see FIG. 6). Next, the supply arm extender 206 goes "out" (to position 206 in FIG. 7) as valve "n" is opened to energize actuator 212. This causes the tape segment 210' to be positioned across the mouth of vacuum chamber 244, as indicated by the dashed lines 210". At this point valve "p" is opened to apply take-up loop vacuum to chamber 244 and cause the length of tape to be drawin into the vacuum chamber 244 as indicated by the dashed lines 211. Valve "n" then closes causing the supply arm extender 206 to be retracted and the sequence holds until a take-up loop sense output is generated by the photocells 245 indicating that the loop is fully received within vacuum chamber 244. Valve "c" is then opened to energize loop hold clamp actuator 256 and cause clamp 250 to clamp the tape loop against the wall of chamber 244 as indicated by the dashed lines.

Valve "m" is then closed to deenergize actuator 228 and allow supply stop 232 to return arm 16 to the position indicated by the dashed lines 189. Valve "l" is then opened to energize actuator 222 and cause supply stop 230 to move supply arm 16 into the position indicated by the solid lines 189'. Valve "f" is then closed to deenergize actuator 274 and cause the cutter 22 to move back to its lower position. Supply stop 230 then goes "off" as valve "l" is closed, and valve "m" is closed causing supply stop 232 to go "off" and return arm 16 to the position indicated by the dashed lines 189.

Valve "t" is now opened to supply vacuum to the supply arm 16; valve "h" is opened to energize lift means 192 and cause the supply arm 16 to go to its "up" position; valve "g" is opened to cause lift means 243 to raise take-up arm 18 to its upper position; and valve "e" closes to deenergize actuator 54 and cause the pack holder return to go "off". The valve "k" is then closed to deenergize actuator 260 and allow take-up arm 240 to return to the position shown by the solid lines 240 in FIG. 7. Supply arm vacuum is then turned off as valve "t" is closed thereby allowing the tension control means 24 to cause reel 30 to take up the slack in the section of tape stretched between the supply arm 16 and take-up arm 18. Valve "t" is then reopened to hold the tape in supply arm 16 and the cutter 22 is raised to its upper position by opening valve "f".

At this point the section of tape 211' is positioned in slot 261 of cutter 22 (see FIG. 7) and valve "o" is opened to actuate cutter blade 263. Valve "o" is then immediately closed to deenergize actuator 263 and allow the cutter blade to retract; valve "h" is closed deenergizing lift means 192 and causing supply arm 16 to drop to its lower position; valve "f" is closed to deenergize actuator 274 and cause cutter 22 to drop to its lower position; and valve "k" is opened to again energize actuator 260 and cause take-up arm 18 to move into the position shown in FIG. 7 by the dashed lines 240'. This causes the cut end of tape strip 211' on the take up arm side to be placed against the face of flyer 68 in abutting relationship with the previously positioned end 210.

Valve "i" is then opened to energize actuator 161 and cause the splicer arm 140 to be driven to the lower position illustrated in FIG. 6 with backing block 142 disposed behind flyer 68. Valve "r" is then opened to supply vacuum to take-up block 72 and cause the take-up end of the tape 210 to be held in the splicing position. Valve "q" is then opened to energize actuator 159 and drive the splicer applicator 154 toward flyer 68 so as to carry the adhesive-backed segment of splicing tape into engagement with the two tape ends which are butted together on the face of flyer 68. Valve "q" is then closed and applicator 140 is retracted. The take-up loop vacuum is then turned off by closing valve "p".

Supply arm 16 is then raised by opening valve "h"; the loop hold clamp is released by closing valve "c"; the supply block vacuum and take-up block vacuum are turned off by closing switches "s" and "r" respectively; valve "i" is closed to deenergize actuator 161 and allow spring 162 to return splicing arm 140 to its upper position; and the take-up arm stop 260 is deenergized by closing valve "k" so that arm 18 returns to its starting position. Positive air pressure is then applied to vacuum chamber 244 by opening valve "d" so as to blow the loop 211 out of chamber 244.

Valve "b" is then opened to energize actuator 117 and drive the hub pick-up assembly 14 downwardly to reposition the hub 41 in the cartridge shell 39 as illustrated in FIG. 2. The hub position shift then goes to "shift" and valve "a" is closed to cause the hub lock to be deenergized, i.e., allowing O-ring 65 to contract thereby releasing engagement of cylinder 63 with hub 41. The loop blow out is then turned off by closing valve "d". The valve "b" is then closed to allow spring 120 to raise the hub drive assembly 14 to its upper position; take-up arm 240 is lowered to its down position by closing valve "g"; and cutter 22 is raised to its upper position by opening valve "f". At this point valve "u" is opened to energize actuator 21 and disengage turntable index 17 (FIG. 2) from the index openings 19 in shaft 15, and motor 43 is energized to rotate turntable 13 to its next position. The above sequence is then continually repeated without need for operator interrruption until the tape supply on reel 30 is exhausted.

Although only schematically shown in FIG. 1, it will be appreciated that a suitable automated shell conveyor or magazine feed could be included to automatically position shells in the slot at position I, an automatic run-in device could be located at position III to run in the loop L, a shell top conveyor and fastening mechanism 304 could be positioned opposite position IV to complete the cartridge assembly, and a cartridge discharge conveyor 306 could be positioned opposite position V to remove the completed cartridges. It will also be appreciated that the device as disclosed could be made entirely automatic or the shell loading, loop run-in capping, and cartridge removal could be done manually.

Among the advantages of the present invention are that all hubs are precision wound with an exactly controlled tension, and a precise loop length is measured out so that when run in, the tape within the cartridge properly tensioned. Moreover, tape wasteage is held to an absolute minimum, splicer tape wasteage is held to be an absolute minimum, and the through-put of the overall device is quite high.

Although a single preferred embodiment of the present invention has been disclosed above, it is contemplated that numerous alterations and modifications may become apparent to those skilled in the art after having read the above disclosure. Accordingly, it is intended that the appended claims be interpreted as covering all such alterations and modifications as fall within the true spirit and scope of the invention.

I claim:

1. Apparatus for loading tape onto the hub of a spool such as that contained in a magnetic tape cartridge, comprising:
   a chassis for supporting the components of said apparatus;
   tape supply means for supplying a continuous strip of tape;
   carriage means for locating at a first position a spool upon which a predetermined length of said strip is to be wound;
   hub drive means disposed proximate said first position and including spindle means for driveably engaging the hub of said spool, and motor means for rotating said spindle means and said hub;
   a cutting means disposed adjacent said first position;
   flyer means carried by said spindle means for releasably holding the ends of said length of said strip;
   tape supply arm means for moving the lead end of said strip into contact with said flyer means, for guiding said strip as it is wound onto said hub, and for aligning and holding said strip relative to said cutting means as said predetermined length is cut therefrom;
   take-up loop arm means for measuring out a selected loop length of the tail portion of said predetermined length, for holding said strip as said predetermined length is cut therefrom by said cutting means, and for moving the tail end of said length into contact with said flyer means and in abutting relationship with said lead end;
   splicing means disposed adjacent to said first position and operative to apply a segment of splicing tape across the abutted lead and tail ends of said length as they are held by said flyer means; and
   control means for actuating each of said above-mentioned means in a predetermined sequence.

2. Apparatus as recited in claim 1 wherein said carriage means includes a turntable having means forming several receptacles for receiving and carrying a cartridge shell containing a spool upon which said predetermined length of tape is to be wound, and means for sequentially indexing each of said receptacles into said first position.

3. Apparatus as recited in claim 2 wherein said carriage means further includes adjustable guide means for locating the cartridge shell within each said receptacle so as to accommodate different types of cartridges that may be loaded by said apparatus.

4. Apparatus as recited in claim 1 wherein said carriage means includes packer arm means for disposition above said spool to insure that the length of tape wound on said hub does not unwind as the spool is moved from said first position to a second position.

5. Apparatus as recited in claim 1 wherein said spindle means includes a cylindrical member having an outside diameter slightly smaller than the inside diameter of the hub of the spool to be driven thereby, and hub engaging means carried by said cylindrical member for releasably locking said hub to said cylindrical member.

6. Apparatus as recited in claim 5 wherein said hub engaging means includes an O-ring circumscribing said cylindrical member, and means for selectively causing the diameter of said O-ring to be expanded to lockingly engage the inside surface of said hub.

7. Apparatus as recited in claim 5 wherein said hub drive means further includes means for moving said cylindrical member into a mating position relative to said hub and for moving said cylindrical member into a winding position after said spindle is locked to said hub thereby lifting said spool away from said carriage means.

8. Apparatus as recited in claim 7 wherein said cylindrical member is carried by said motor means and said means for moving said cylindrical member includes a pneumatic actuator energized by said control means and adapted to move said motor means between a raised position and a lowered position.

9. Apparatus as recited in claim 1 wherein said flyer means includes a member extending radially outwardly from said spindle means and terminating in an end surface having a first portion for mating with the lead end of said predetermined length of tape and a second portion for mating with the tail end of said predetermined length of tape, said first and second surface portions each having a plurality of openings which are coupled to a vacuum supply to provide means for holding the ends of said predetermined length of tape in engagement therewith.

10. Apparatus as recited in claim 1 wherein said tape supply arm means includes an elongated member pivotally affixed to said chassis, said member including means forming a guide way for said strip of tape, one end of said member being movable between a first position wherein said strip is aligned with said cutting means, a second position wherein the lead end of said strip is placed in contact with said first portion of said flyer means, and a third position wherein said strip is fed onto said hub during the winding operation.

11. Apparatus as recited in claim 10 wherein said supply arm means further includes an extender means at said one end which in its extended position causes said strip to be placed in contact with said take-up arm means.

12. Apparatus as recited in claim 11 wherein said supply arm means further includes means for selectively holding said strip to prevent relative movement therebetween.

13. Apparatus as recited in claim 10 wherein said supply arm means is also movable along its pivot axis between a raised position and a lowered position, said supply arm means being moved into said lowered position when it is in said third position feeding said strip onto said hub.

14. Apparatus as recited in claim 1 wherein said take-up arm means includes an elongated member having a vacuum chamber extending into one end thereof for drawing in a portion of said strip to determine the loop length of the tape wound upon said hub.

15. Apparatus as recited in claim 14 wherein said elongated member is pivotally affixed to said chassis with said one end being rotatable between one position in which said strip is aligned with said cutting means and another position wherein said tail end is placed in contact with said second portion of said flyer means.

16. Apparatus as recited in claim 14 wherein said take-up arm means further includes means for determining when the portion of tape defining said loop length has been fully drawn into said vacuum chamber.

17. Apparatus as recited in claim 1 wherein said cutting means includes a slot for receiving said strip, and a cutting element adapted to pass transverse to said slot to sever said strip, said supply arm means and said take-up arm means being positioned on opposite sides of said cutting means so that a portion of said strip bridging between them will be aligned with said slot so that actuation of said cutting means causes said element to sever the bridging portion of said strip to form the tail end of a previously wound length and the lead end of the next length of tape to be wound.

18. Apparatus as recited in claim 17 wherein said cutting means is movable between a raised position and a lowered position, the actuation of said cutting means normally taking place when it is in said raised position.

19. Apparatus as recited in claim 1 wherein said splicing means includes means providing a quantity of splicing tape, means for severing said segment from said quantity, and applicator means for carrying said segment into overlying engagement with said lead and tail end sheld by said flyer means in order to effect a splice.

20. Apparatus as recited in claim 19 wherein said applicator means includes a shuttle mechanism having a flat end face for receiving said segment, said end face having a plurality of openings therein through which a vacuum may be drawn to releasably hold said segment against said end face.

21. Apparatus as recited in claim 9 wherein said splicer means includes means providing a quantity of splicing tape, means for severing said segment from said quantity, and applicator means for carrying said segment into said overlying engagement with said lead and tail ends to effect a splice, said applicator means including a shuttle mechanism having a flat end face for receiving said segment, said end face having a plurality of openings therein through which a vacuum may be drawn to releasably hold said segment against said end face.

22. Apparatus as recited in claim 21 wherein said flyer means includes a back surface on the opposite side of said end surface, and said splicing means includes means forming a backing bar for engaging said back surface to counteract any forces applied to said flyer means as said segment is applied across said lead and tail ends.

23. Apparatus as recited in claim 1 wherein said tape supply means includes a tape containing reel and a motor for driving said reel, and wherein said control means includes means for sensing the tension of the length of tape stretched between said reel and said supply arm means and for developing a tension indicating signal, and means responsive to said tension indicating signal for controlling the drive speed of said motor to thereby control said tension.

24. Apparatus as recited in claim 23 wherein said tension sensing means includes a vacuum chamber into which a portion of said tape is drawn and photo optical detector means for detecting the length of said portion of tape drawn into said chamber when the vacuum created therein is held constant.

25. Apparauts as recited in claim 24 and further including tachometer means for monitoring the length of tape passing from said reel to said hub and for generating a length signal for input to said control means.

* * * * *